United States Patent
Kao et al.

(10) Patent No.: US 7,411,732 B2
(45) Date of Patent: Aug. 12, 2008

(54) BACKLIGHT MODULE AND BRIGHTNESS ENHANCEMENT FILM THEREOF

(75) Inventors: Ko-Chia Kao, Pingtung County (TW); Chih-Kuang Chen, Kaohsiung (TW); Jyh-Haur Huang, Pingtung County (TW)

(73) Assignee: Au Optronics Corp., Hsin-chu (TW)

( * ) Notice: Subject to any disclaimer, the term of this patent is extended or adjusted under 35 U.S.C. 154(b) by 0 days.

(21) Appl. No.: 11/736,041

(22) Filed: Apr. 17, 2007

(65) Prior Publication Data
US 2007/0188872 A1    Aug. 16, 2007

Related U.S. Application Data

(63) Continuation of application No. 11/177,918, filed on Jul. 8, 2005, now Pat. No. 7,262,916.

(30) Foreign Application Priority Data

Mar. 16, 2005    (TW) ............... 94108098 A

(51) Int. Cl.
G02B 13/20    (2006.01)
G02B 5/02     (2006.01)

(52) U.S. Cl. .............. 359/599; 359/831; 362/620; 362/626

(58) Field of Classification Search ........ 359/599, 359/707, 831–837; 362/31, 620–627
See application file for complete search history.

(56) References Cited

U.S. PATENT DOCUMENTS

| | | | |
|---|---|---|---|
| 4,883,341 A | 11/1989 | Whitehead | 359/601 |
| 4,906,070 A | 3/1990 | Cobb, Jr. | 359/834 |
| 4,984,144 A | 1/1991 | Cobb, Jr. et al. | 362/339 |
| 5,056,892 A | 10/1991 | Cobb, Jr. | 359/831 |
| 5,546,235 A | 8/1996 | Park | 359/742 |
| 5,771,328 A | 6/1998 | Wortman et al. | 385/146 |
| 5,851,062 A | 12/1998 | Shinohara et al. | 362/620 |
| 5,908,874 A | 6/1999 | Fong et al. | 522/24 |
| 5,917,664 A | 6/1999 | O'Neill et al. | 359/831 |
| 5,919,551 A | 7/1999 | Cobb, Jr. et al. | 428/156 |
| 5,961,197 A | 10/1999 | Watai et al. | 362/628 |
| 6,025,897 A | 2/2000 | Weber et al. | 349/96 |
| 6,052,164 A | 4/2000 | Cobb, Jr. et al. | 349/64 |
| 6,091,547 A | 7/2000 | Gardiner et al. | |
| 6,091,574 A | 7/2000 | Misso | 360/265.9 |

(Continued)

*Primary Examiner*—Thong Nguyen
(74) *Attorney, Agent, or Firm*—Thomas, Kayden, Horstemeyer & Risley

(57) ABSTRACT

A backlight module includes a light source, a light guide disposed on one side of the light source, a reflector disposed under the light guide, a lower diffuser disposed on the light guide, and a brightness enhancement film, which is disposed on the lower diffuser and includes a main part and several prism structures disposed side by side on a main part plane of the main part. Each prism structure includes first to third triangular prisms. The second triangular prism is adjacent to one side of the first triangular prism, and an adjacent angle adjacent to a base angle of the first triangular prism is a right angle. The third triangular prism is adjacent to another side of the first triangular prism, and an adjacent angle adjacent to another base angle of the first triangular prism is a right angle.

15 Claims, 5 Drawing Sheets

U.S. PATENT DOCUMENTS

| | | | |
|---|---|---|---|
| 6,280,063 B1 | 8/2001 | Fong et al. | 362/333 |
| 6,407,859 B1 | 6/2002 | Hennen et al. | 359/454 |
| 6,456,437 B1 | 9/2002 | Lea et al. | 359/625 |
| 6,707,611 B2 | 3/2004 | Gardiner et al. | 359/619 |
| 6,798,574 B2 * | 9/2004 | Kim | 359/566 |
| 6,854,855 B2 | 2/2005 | Munro et al. | 362/620 |
| 6,981,791 B2 | 1/2006 | Higashiyama | 362/600 |
| 7,072,116 B2 | 7/2006 | Okuwaki et al. | 359/599 |
| 7,210,840 B2 * | 5/2007 | Maeda et al. | 362/626 |
| 7,262,916 B2 * | 8/2007 | Kao et al. | 359/599 |
| 2005/0243575 A1 | 11/2005 | Kunimochi | |

* cited by examiner

BACKLIGHT MODULE AND BRIGHTNESS ENHANCEMENT FILM THEREOF

This is a continuation of U.S. application Ser. No. 11/177,918, filed Jul. 8, 2005, now U.S. Pat. No. 7,262,916, the subject matter of which is incorporated herein by reference.

BACKGROUND OF THE INVENTION

1. Field of the Invention

The invention relates in general to a backlight module and a brightness enhancement film thereof, and more particularly to a brightness enhancement film of a prism structure capable of avoiding the light-leakage to be generated at a large viewing angle.

2. Description of the Related Art

A brightness enhancement film is disposed on a backlight module of a liquid crystal display (LCD) to enhance the light-emitting efficiency. FIG. 1A is a pictorial view showing a conventional brightness enhancement film. Referring to FIG. 1A, a brightness enhancement film 110 includes a main part 120 and several prism structures 130. The prism structures 130 are isosceles right triangular pillars and are repeatedly formed on the main part 120 and arranged in a straight line. FIG. 1B is a graph showing the relationship between the viewing angle and the brightness of the brightness enhancement film of FIG. 1A, wherein the transverse coordinate represents the light outputting angle after the light passes through the conventional brightness enhancement film, and the longitudinal coordinate represents the brightness of light. The thick line in the drawing represents the relationship curve of the viewing angle verse the brightness of the conventional brightness enhancement film in the vertical direction, while the thin line represents the relationship curve of the viewing angle verse the brightness of the conventional brightness enhancement film in the horizontal direction. As shown in FIG. 1B, the light passing through the conventional brightness enhancement film is mostly outputted at the small viewing angle (0° to 45°), so the film has a light gathering effect.

However, a small part of the light encounters the light-leakage phenomenon at a large viewing angle. That is, in FIG. 1B, a part of the light along the horizontal direction is outputted within the range of the viewing angle from 60° to 75°, such that the curve has a local peak value within the range. Because the light emitting region of the large viewing angle (60° to 90°) is a non-effective region, the conventional brightness enhancement film causes the light-leakage in this region, thereby wasting the energy.

There are many technologies relating to the prism structure of the brightness enhancement film being developed. For example, the following methods can achieve the object of enhancing the light-emitting efficiency according to specific technological features.

A brightness enhancement film having several pairs of prism structures is disclosed in U.S. Pat. No. 5,917,664. In each pair of prism structures, two prism angles or two valley angles are the same. This prism structure makes the relationship curve between view angle and brightness partly distribute at a viewing angle smaller than 40°. In addition, when the angle increases, the decreasing trend of the curve is gentler. However, this patent cannot solve the problem of light-leakage at a viewing angle greater than 60° after the light passes through the brightness enhancement film.

An optical film having repeated prism structures is disclosed in U.S. Pat. No. 6,707,611 B2. The optical film can eliminate the problem of luminance non-uniformity. However, this patent also cannot solve the problem of light-leakage at a large viewing angle after the light passes through the optical film.

A brightness enhancement film is disclosed in U.S. Pat. No. 6,280,063 B1. The brightness enhance film includes an upper surface having a specific ratio of an arced prism angle and a lower surface having protrusions for scattering the light. This brightness enhancement film can provide a wider viewing angle in each of the horizontal and vertical directions, and can enhance the light brightness.

Although the above-mentioned prior arts can enhance the light-emitting efficiency, the problem of light-leakage at the viewing angle from 60° to 90° after the light passes through the brightness enhancement film still cannot be solved, and the energy is wasted accordingly.

SUMMARY OF THE INVENTION

It is therefore an object of the invention to provide a brightness enhancement film, which includes several prism structures perpendicular to a vertical surface of a main part plane and can ease the phenomenon of light-leakage of a backlight module at a large viewing angle and enhance the light availability.

The invention achieves the above-identified object by providing a brightness enhancement film, which includes a main part having a main part plane, and several prism structures disposed side by side on the main part plane. Each of the prism structures includes a first triangular prism, a second triangular prism and a third triangular prism. The second triangular prism is adjacent to one side of the first triangular prism. An adjacent angle adjacent to a base angle of the first triangular prism is a right angle. The third triangular prism is adjacent to another side of the first triangular prism. An adjacent angle adjacent to another base angle of the first triangular prism is a right angle.

The invention also achieves the above-identified object by providing a brightness enhancement film, which includes a main part having a main part plane, and several prism structures disposed side by side on the main part plane. Each of the prism structures includes a first triangular prism, a second triangular prism and a third triangular prism. The first triangular prism has a first rectangular plane, a second rectangular plane and a third rectangular plane. The third rectangular plane overlaps with the main part plane, the third rectangular plane has a long side substantially parallel to and equal to one side of the main part plane, and the first rectangular plane and the second rectangular plane define a first angle. The second triangular prism has a fourth rectangular plane, a fifth rectangular plane and a sixth rectangular plane. The sixth rectangular plane overlaps with the main part plane, the sixth rectangular plane has a long side overlapping with the long side of the third rectangular plane, the fourth rectangular plane is perpendicular to the main part plane, and the fourth rectangular plane and the fifth rectangular plane define a second angle. The third triangular prism has a seventh rectangular plane, an eighth rectangular plane and a ninth rectangular plane. The ninth rectangular plane overlaps with the main part plane, the ninth rectangular plane has a long side overlapping with another long side of the third rectangular plane, the seventh rectangular plane is perpendicular to the main part plane and faces the fourth rectangular plane, and the seventh rectangular plane and the eighth rectangular plane define a third angle.

The invention also achieves the above-identified object by providing a backlight module to be mounted in a liquid crystal display (LCD). The backlight module includes a light source for generating light, a light guide disposed on one side of the light source to guide the light in, a reflector disposed under the light guide to reflect the light, a lower diffuser disposed on the light guide to diffuse the light outputted from the light guide, and a brightness enhancement film disposed on the lower diffuser to enhance the light efficiency. The brightness enhancement film includes a main part including a main part plane, and several prism structures disposed on the main part plane. Each of the adjacent prism structures includes a first triangular prism, a second triangular prism and a third triangular prism. The first triangular prism has a first rectangular plane, a second rectangular plane and a third rectangular plane. The third rectangular plane overlaps with the main part plane, the third rectangular plane has a long side substantially parallel to and equal to one side of the main part plane, and the first plane and the second rectangular plane define a first angle. The second triangular prism has a fourth rectangular plane, a fifth rectangular plane and a sixth rectangular plane. The sixth rectangular plane overlaps with the main part plane, the sixth rectangular plane has a long side overlapping with the long side of the third rectangular plane, the fourth rectangular plane is perpendicular to the main part plane, and the fourth rectangular plane and the fifth rectangular plane define a second angle. The third triangular prism has a seventh rectangular plane, an eighth rectangular plane and a ninth rectangular plane. The ninth rectangular plane overlaps with the main part plane, the ninth rectangular plane has a long side overlapping with another long side of the third rectangular plane, the seventh rectangular plane is perpendicular to the main part plane and faces the fourth rectangular plane, and the seventh rectangular plane and the eighth rectangular plane define a third angle.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2A:
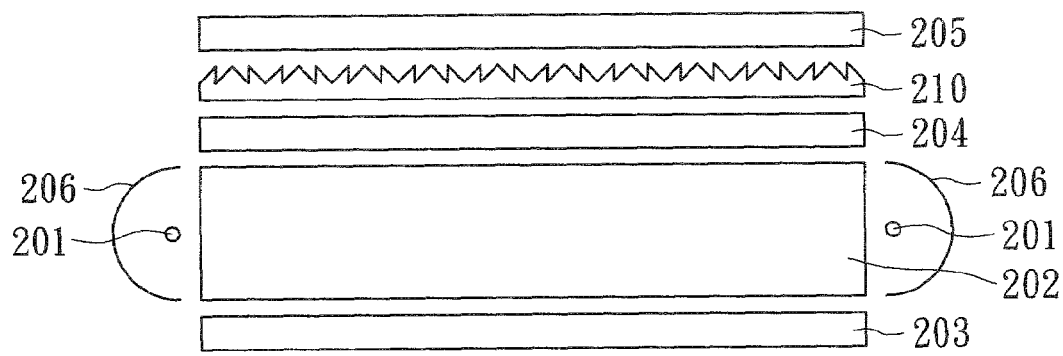
FIG. 2A is a schematic illustration showing a backlight module according to a preferred embodiment of the invention.

FIG. 2A is a schematic illustration showing a backlight module according to a preferred embodiment of the invention. As shown in FIG. 2A, a backlight module 200 is to be mounted in a liquid crystal display (LCD), and the backlight module 200 includes a light source 201, a light guide 202, a reflector 203, a lower diffuser 204 and a brightness enhancement film 210. Preferably, the backlight module 200 of this embodiment further includes an upper diffuser 205 and a light source reflector 206. The light source 201, which is preferably disposed on two sides of the backlight module 200, generates light. The light guide 202, which is disposed on one side of the light source 201, guides and mixes the light. The reflector 203, which is disposed on the light guide 202, reflects the light generated by the light source 201. The lower diffuser 204, which is disposed on the light guide 202, diffuses the light outputted from the light guide 202. The brightness enhancement film 210, which is disposed on the lower diffuser 204, enhances the availability of the light passing through the lower diffuser 204. The upper diffuser 205 is disposed on the brightness enhancement film 210. The light source reflector 206 surrounding the light source 201 reflects the light generated by the light source 201, to make the light enter the light guide 202.

Figure 2B:
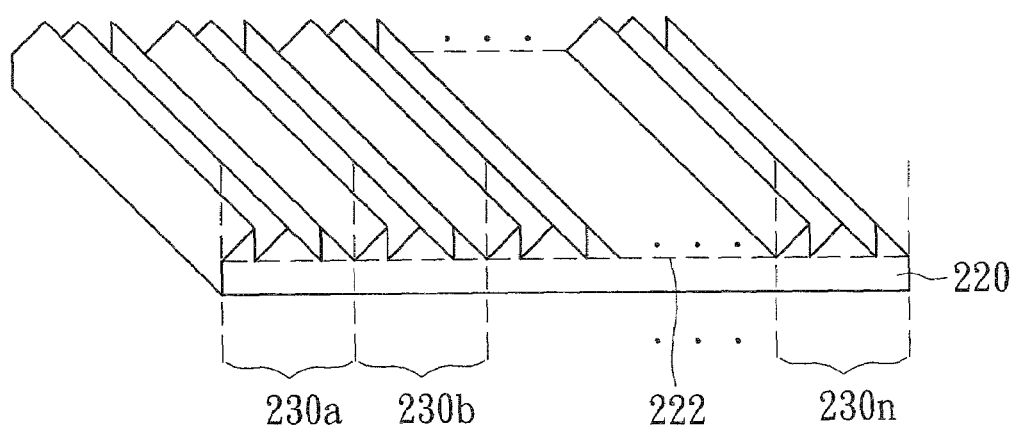
FIG. 2B is a pictorial view showing a brightness enhancement film of FIG. 2A.

FIG. 2B is a pictorial view showing a brightness enhancement film of FIG. 2A. Referring to FIG. 2B, the brightness enhancement film 210 of this embodiment includes a main part 220 and several prism structures. The main part 220 has a main part plane 222. Several prism structures 230a, 230b to 230n are side by side formed on the main part plane 222. These prism structures 230a, 230b to 230n are adjacent to one another.

Figure 3:
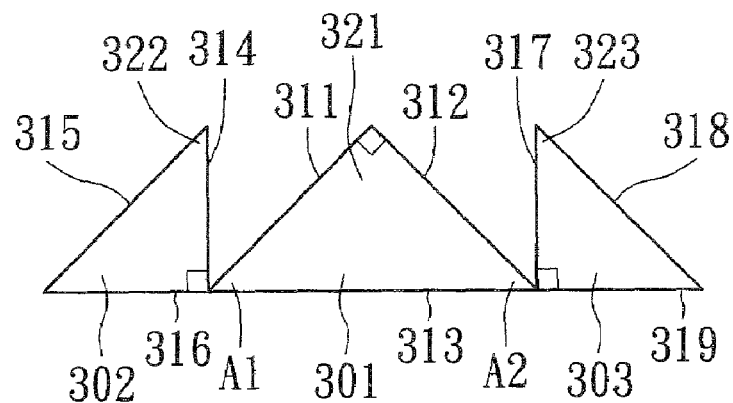
FIG. 3 is a cross-sectional view showing a prism structure of FIG. 2B.

FIG. 3 is a cross-sectional view showing the prism structure 230a of FIG. 2B. As shown in FIG. 3, each prism structure, such as the prism structure 230a, in the brightness enhancement film 210 of this embodiment includes a first triangular prism 301, a second triangular prism 302 and a third triangular prism 303. The second triangular prism 302 is adjacent to one side of the first triangular prism 301. An adjacent angle adjacent to a base angle A1 of the first triangular prism 301 is a right angle. The third triangular prism 303 is adjacent to another side of the first triangular prism 301, and an adjacent angle adjacent to another base angle A2 of the first triangular prism 301 is a right angle.

The first triangular prism 301 has a first rectangular plane 311, a second rectangular plane 312 and a third rectangular plane 313. The third plane 313 overlaps with the main part plane 222, and a long side of the third rectangular plane 313 is substantially parallel to and equal to one side of the main part plane 222. The first rectangular plane 311 and the second rectangular plane 312 define a first angle 321.

The second triangular prism 302 has a fourth rectangular plane 314, a fifth rectangular plane 315 and a sixth rectangular plane 316. The sixth rectangular plane 316 overlaps with the main part plane 222, and a long side of the sixth rectangular plane 316 overlaps with the long side of the third rectangular plane 313. The fourth rectangular plane 314 is perpendicular to the main part plane 222, and the fourth rectangular plane 314 and the fifth rectangular plane 315 define a second angle 322.

The third triangular prism 303 has a seventh rectangular plane 317, an eighth rectangular plane 318 and a ninth rectangular plane 319. The ninth rectangular plane 319 overlaps with the main part plane 222, and a long side of the ninth rectangular plane 319 overlaps with another long side of the third rectangular plane 313. The seventh rectangular plane 317 is perpendicular to the main part plane 222 and faces the fourth rectangular plane 314. The seventh rectangular plane 317 and the eighth rectangular plane 318 define a third angle 323.

In this embodiment, the second triangular prism 302 and the third triangular prism 303 are preferably symmetrical with respect to the first triangular prism 301. That is, the second angle 322 and the third angle 323 have the same value, such as 45°. However, the embodiment does not intend to limit the second angle 322 and the third angle 323 at 45°, and the light may be restricted as long as the fourth rectangular plane 314 and the seventh rectangular plane 317 are perpendicular to the main part plane. In addition, the first triangular prism 301 in this embodiment is preferably an isosceles right triangular pillar, and the first angle 321 is 90°.

Figure 4:
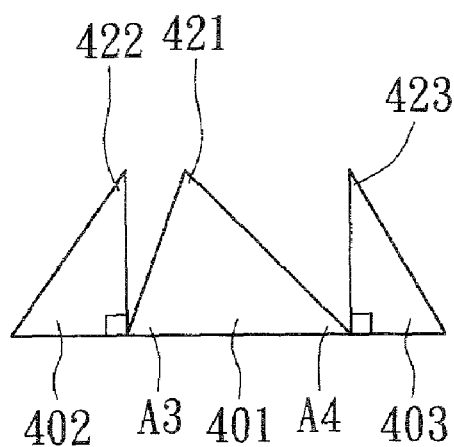
FIG. 4 is a cross-sectional view showing another prism structure of the invention.

However, the present embodiment of the invention does not intend to be limited by the above-mentioned prism structure 230a. FIG. 4 is a cross-sectional view showing another prism structure of the invention. Referring to FIG. 4, a prism structure 430 has a first triangular prism 401, a second triangular prism 402 and a third triangular prism 403. In the second triangular prism 402, an adjacent angle adjacent to a base angle A3 of the first triangular prism 401 is a right angle. In the third triangular prism 403, an adjacent angle adjacent to another base angle A4 of the first triangular prism 401 is also a right angle. It is to be noted that the first triangular prism 401 is not an isosceles right triangular pillar. That is, the first angle 421 is not equal to 90°. In addition, the second angle 422 and the third angle 423 are not the same and are not equal to 45°. That is, the prism structure of the present embodiment of the invention is not limited to the symmetrical prism structure. Any prism structure having the second triangular prism and the third triangular prism, in which the adjacent angle adjacent to the base angle of the first triangular prism is a right angle, falls within the range to be protected by this invention.

Figure 1A:
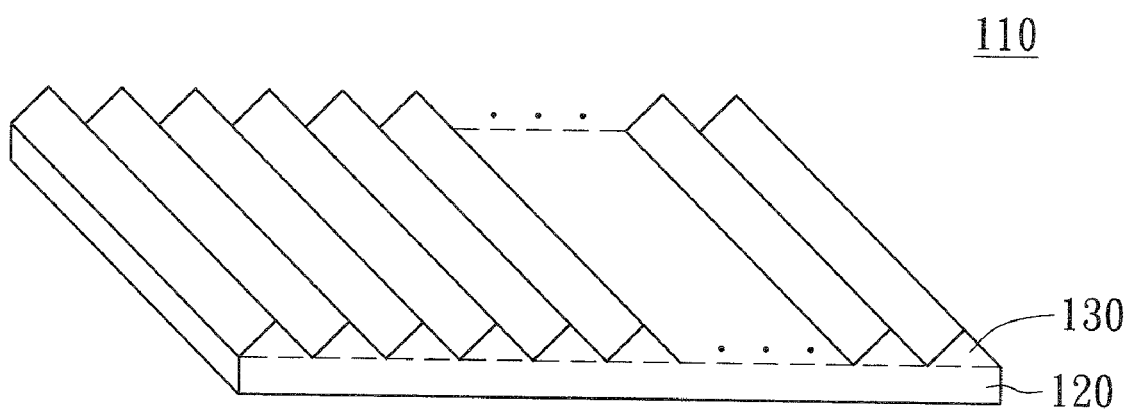
FIG. 1A (Related Art) is a pictorial view showing a conventional brightness enhancement film.
Figure 1B:
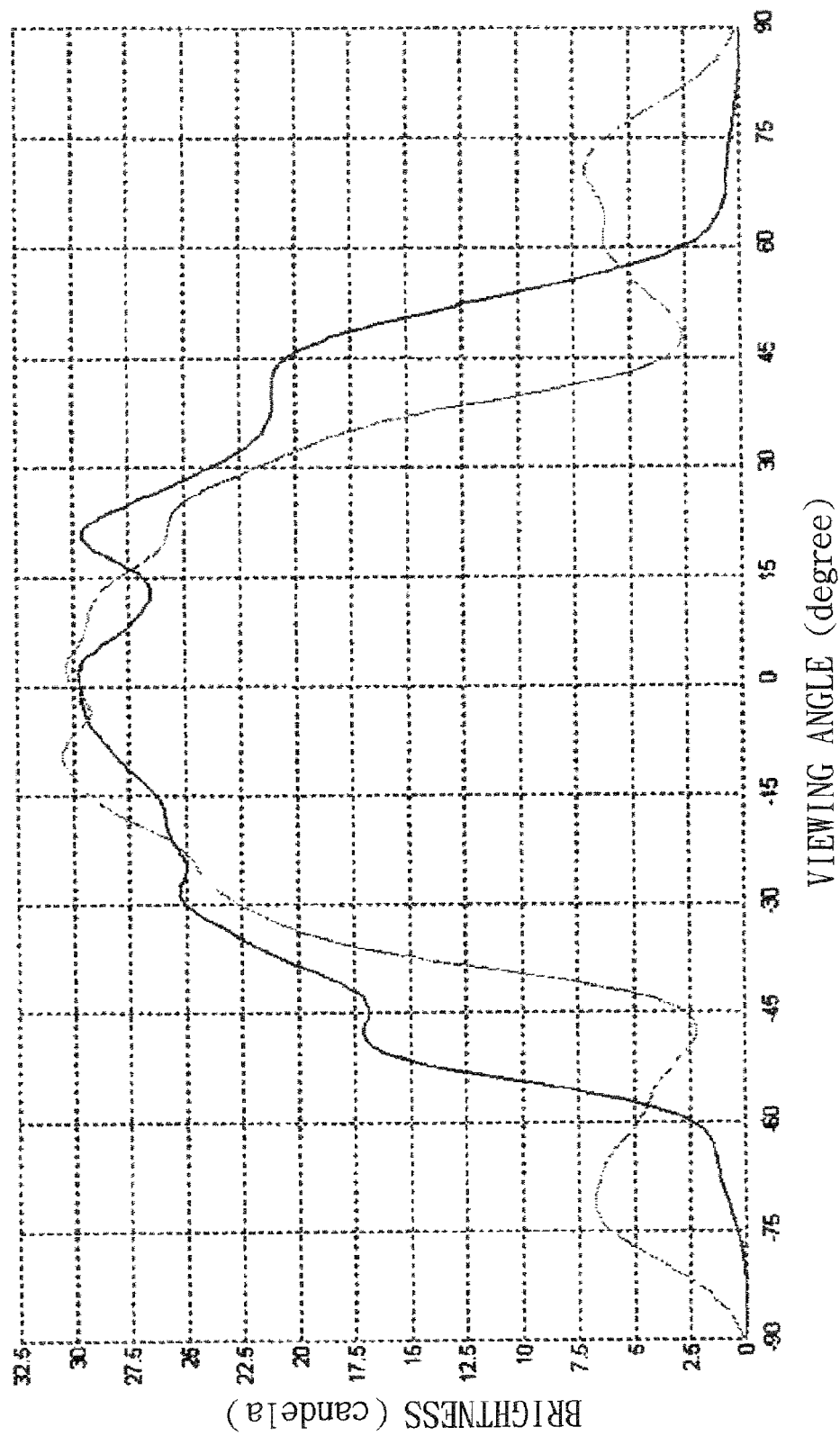
FIG. 1B (Related Art) is a graph showing the relationship between the viewing angle and the brightness of the brightness enhancement film of FIG. 1A.
Figure 5:
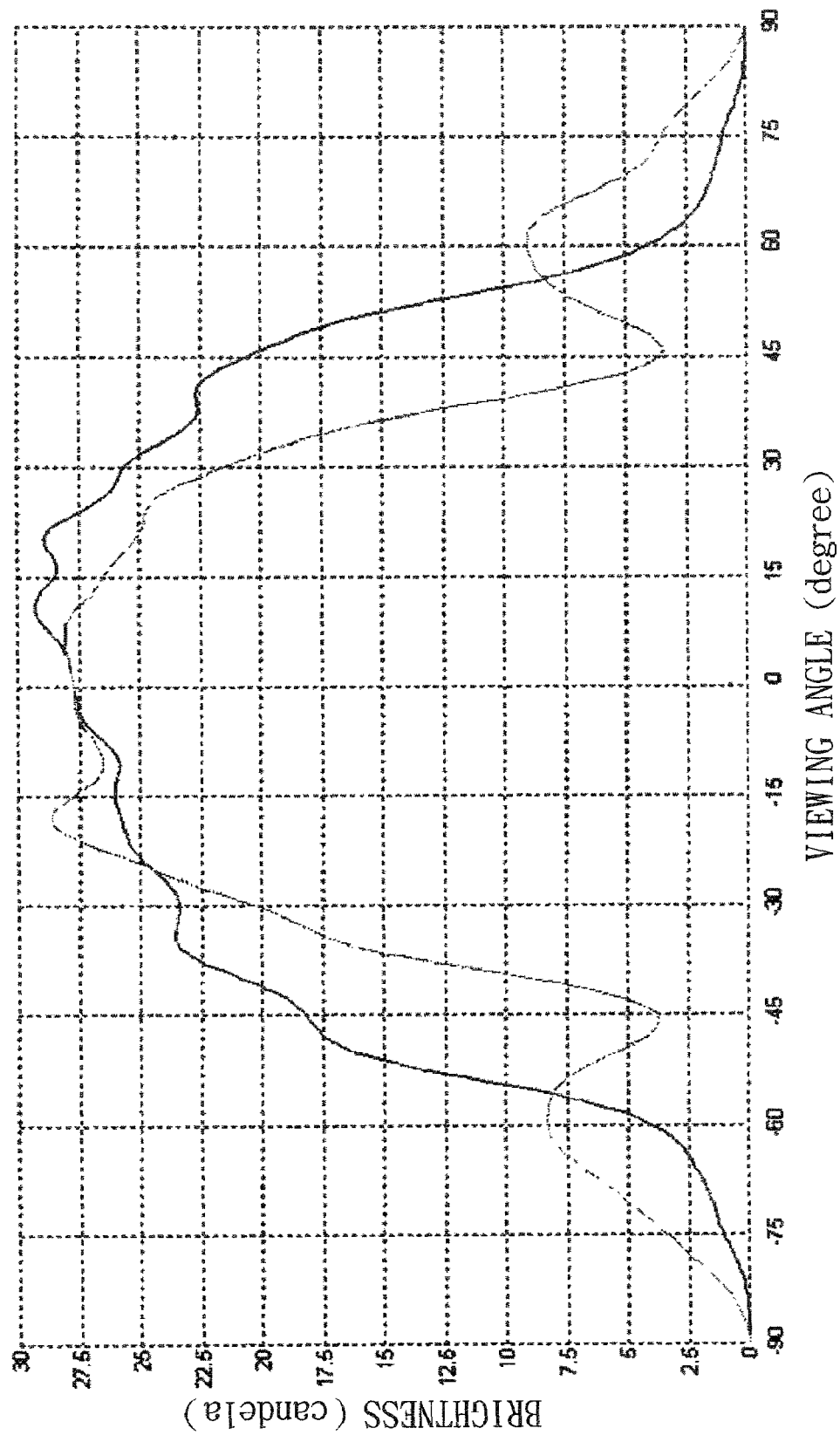
FIG. 5 is a graph showing the viewing angle and the brightness of the brightness enhancement film of FIG. 2B.

The prism structure of the brightness enhancement film according to the embodiment of the invention is made according to the property of the light gathering effect of the vertical surface perpendicular to the main part plane, such that the prism structure has three parallel triangular prisms, and each of the triangular prisms at left and right sides has a vertical surface to restrict the light to directly output from the diffuser. Thus, the condition of light-leakage at the large viewing angle at two sides of the light emitting region in the conventional brightness enhancement film can be improved. FIG. 5 is a graph showing the viewing angle and the brightness of the brightness enhancement film 210 of FIG. 2B, wherein the transverse coordinate represents the light-outputting angle after the light passes through the brightness enhancement film 210, and the longitudinal coordinate represents the brightness of the light. As shown in FIG. 5, the thick line represents the relationship curve of the brightness verse the viewing angle of the brightness enhancement film 210 in the vertical direction, and the thin line represents the relationship curve of the brightness verse the viewing angle of the brightness enhancement film 210 in the horizontal direction. As shown in FIGS. 1B and 5, the brightness enhancement film of this embodiment gathers the brightness distribution of the passed light toward the region of the small viewing angle, and the curve of the light in the horizontal direction of FIG. 5 has a local peak value within the range of the viewing angle from 55° to 65°. Compared to the conventional brightness enhancement film, in which the local peak value appears within the range from 60° to 75° in FIG. 1B, the local peak value of the brightness enhancement film 210 is gathered at the small viewing angle. The brightness enhancement film of this embodiment makes the light output focus at the effective angle (small viewing angle), thereby enhancing the light availability, reducing the wasted energy, and thus enhancing the brightness of the backlight module.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A brightness enhancement structure, comprising:
an upper diffuser and a lower diffuser, for diffusing surface light;
a brightness enhancement film disposed between the upper diffuser and the lower diffuser, for enhancing the surface light passing through the lower diffuser, the brightness enhancement film comprising:
a main part having a main part plane; and
a plurality of prism structures successively disposed side by side on the main part plane, each of the prism structures comprising:
a first triangular prism;
a second triangular prism having a first right angle, adjacent to one side of the first triangular prism, the first right angle being adjacent to one base angle of the first triangular prism; and
a third triangular prism having a second right angle, adjacent to another side of the first triangular prism, the second right angle being adjacent to an other base angle of the first triangular prism, wherein the one base angle and the other base angle of the first triangular prism have different angular magnitudes;
wherein the first triangular prism, the second triangular prism, and the third triangular prism have different orientations and are disposed on the main part plane;
wherein the second triangular prism of one of the prism structures is adjacent to the third triangular prism of an adjacent one of the prism structures, and the second triangular prism of the one prism structure and the third triangular prism of the adjacent one prism structure have different orientations.

2. The brightness enhancement structure according to claim 1, wherein a top angle of the second triangular prism and a top angle of the third triangular prism are not the same.

3. The brightness enhancement structure according to claim 1, wherein a top angle of the second triangular prism and a top angle of the third triangular prism are acute angles.

4. The brightness enhancement structure according to claim 1, wherein a top angle of the first triangular prism is an acute angle.

5. A brightness enhancement structure, comprising:
an upper diffuser and a lower diffuser, for diffusing surface light;
a brightness enhancement film disposed between the upper diffuser and the lower diffuser, for enhancing the surface light passing through the lower diffuser, the brightness enhancement film comprising:
a main part having a main part plane; and
a plurality of prism structures successively disposed side by side on the main part plane, each of the prism structures comprising:
a first triangular prism having a first plane, a second plane and a third plane, wherein the third plane overlaps with the main part plane, the third plane has a long side substantially parallel to and equal to one side of the main part plane, the first plane and the second plane define a first angle, the first plane and the third plane define one base angle, the second plane and the third plane define an other base angle, and the one base angle and the other base angle of the first triangular prism have different angular magnitudes;
a second triangular prism having a fourth plane, a fifth plane and a sixth plane, wherein the sixth plane overlaps with the main part plane, the sixth plane has a long side overlapping with the long side of the third plane, the fourth plane is perpendicular to the main part plane, and the fourth plane and the fifth plane define a second angle; and a third triangular prism having a seventh plane, an eighth plane and a ninth plane, wherein the ninth plane overlaps with the main part plane, the ninth plane has a long side overlapping with another long side of the third plane, the seventh plane is perpendicular to the main part plane and faces the fourth plane, and the seventh plane and the eighth plane define a third angle;

wherein the first triangular prism, the second triangular prism, and the third triangular prism have different orientations;

wherein the second triangular prism of one of the prism structures is adjacent to the third triangular prism of adjacent one of the prism structures, and the second triangular prism of the one prism structure and the third triangular prism of the adjacent one prism structure have different orientations.

6. The brightness enhancement structure according to claim 5, wherein the second angle and the third angle are not the same.

7. The brightness enhancement structure according to claim 5, wherein the first angle is an acute angle.

8. The brightness enhancement structure according to claim 7, wherein the first triangular prism is a scalene triangular pillar.

9. A backlight module, comprising:
a light source for generating light;
a light guide disposed on one side of the light source, for guiding and mixing the light generated by the light source and outputting surface light;
a reflector disposed under the light guide, for reflecting the light generated by the light source;
an upper diffuser and a lower diffuser, wherein the lower diffuser is disposed on the light guide, for diffusing the surface light outputted from the light guide; and
a brightness enhancement film disposed between the upper diffuser and the lower diffuser, for enhancing the surface light passing through the lower diffuser, the brightness enhancement film comprising:
a main part including a main part plane; and
a plurality of prism structures successively disposed side by side on the main part plane, each of the prism structures comprising:
a first triangular prism having a first plane, a second plane and a third plane, wherein the third plane overlaps with the main part plane, the third plane has a long side substantially parallel to and equal to one side of the main part plane, the first plane and the second plane define a first angle, the first plane and the third plane define one base angle, the second plane and the third plane define an other base angle, and the one base angle and the other base angle of the first triangular prism have different angular magnitudes;
a second triangular prism having a fourth plane, a fifth plane and a sixth plane, wherein the sixth plane overlaps with the main part plane, the sixth plane has a long side overlapping with the long side of the third plane, the fourth plane is perpendicular to the main part plane, and the fourth plane and the fifth plane define a second angle; and
a third triangular prism having a seventh plane, an eighth plane and a ninth plane, wherein the ninth plane overlaps with the main part plane, the ninth plane has a long side overlapping with another long side of the third plane, the seventh plane is perpendicular to the main part plane and faces the fourth plane, and the seventh plane and the eighth plane define a third angle;

wherein the first triangular prism, the second triangular prism, and the third triangular prism have different orientations and are disposed on the main part plane;

wherein the second triangular prism of one of the prism structures is adjacent to the third triangular prism of adjacent one of the prism structures, and the second triangular prism of the one prism structure and the third triangular prism of the adjacent one prism structure have different orientations.

10. The backlight module according to claim 9, wherein the second angle and the third angle are not the same.

11. The backlight module according to claim 9, wherein the first angle is an acute angle.

12. The backlight module according to claim 11, wherein the first triangular prism is a scalene triangular pillar.

13. The backlight module according to claim 9, further comprising a light source reflector disposed on another side of the light source.

14. A backlight module, comprising:
a light source for generating light;
a light guide disposed on one side of the light source, for guiding and mixing the light generated by the light source and outputting surface light;
a reflector disposed under the light guide, for reflecting the light generated by the light source;
an upper diffuser and a lower diffuser, wherein the lower diffuser is disposed on the light guide, for diffusing the surface light outputted from the light guide; and
a brightness enhancement film disposed between the upper diffuser and the lower diffuser, for enhancing the surface light passing through the lower diffuser, the brightness enhancement film comprising:
a main part including a main part plane; and
a plurality of prism structures successively disposed side by side on the main part plane, each of the prism structures comprising:
a first triangular prism;
a second triangular prism having a first right angle, adjacent to one side of the first triangular prism, the first right angle being adjacent to one base angle of the first triangular prism; and
a third triangular prism having a second right angle, adjacent to another side of the first triangular prism, the second right angle being adjacent to an other base angle of the first triangular prism, wherein the one base angle and the other base angle of the first triangular prism have different angular magnitudes;

wherein the first triangular prism, the second triangular prism, and the third triangular prism have different orientations and are disposed on the main part plane;

wherein the second triangular prism of one of the prism structures is adjacent to the third triangular prism of adjacent one of the prism structures, and the second triangular prism of the one prism structure and the third triangular prism of the adjacent one prism structure have different orientations.

15. The backlight module according to claim 14, wherein a top angle of the first triangular prism is an acute angle.

* * * * *